Nov. 8, 1938.   R. C. BENNER ET AL   2,136,096
CELLULAR INSULATING REFRACTORY
Filed July 1, 1935
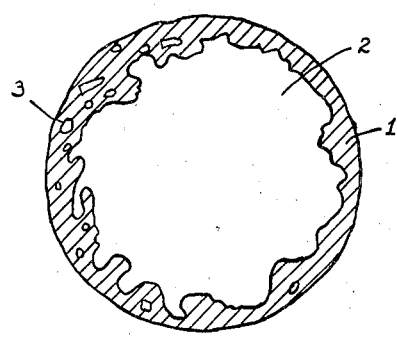
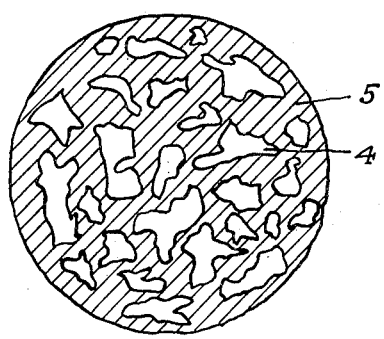
INVENTOR.
RAYMOND C. BENNER
HENRY N. BAUMANN, JR.
BY
ATTORNEY.

Patented Nov. 8, 1938

2,136,096

UNITED STATES PATENT OFFICE 2,136,096

CELLULAR INSULATING REFRACTORY

Raymond C. Benner and Henry N. Baumann, Jr., Niagara Falls, N. Y., assignors, by mesne assignments, to Carborundum Company, Niagara Falls, N. Y., a corporation of Delaware Application July 1, 1935, Serial No. 29,429

12 Claims. (Cl. 106—9)

This application relates to improved insulating refractories and to cellular pellets for the production thereof and for other purposes.

It has been known that relatively pure oxides, such as alumina or magnesia or mixtures of lime, magnesia and alumina, could be formed into hollow bubbles by melting these oxides and pouring a stream of molten material past an air or steam jet. We have made such bubbles and have attempted to use them in the fabrication of insulating bricks but have found them to be difficult to utilize satisfactorily because of the extreme fragility of the thin walled bubbles. In atempting to mix such bubbles with clay or other bonding materials, the blades of the mixing apparatus crush the bubbles to fragmentary bits having little or no included air space and seriously impair their insulating value. Further crushing also occurs in the pressing operation by which bricks are formed.

We have discovered, however, that when double oxides are melted in suitable proportions the character of the pellets produced is radically altered, so that instead of being thin walled hollow bubbles they become rugged multi-cellular pellets. Such pellets can be mixed with bond and pressed without damage and are, moreover, superior to the hollow bubble type for insulating purposes in that the air space within them is more finely subdivided.

Fig. 1 illustrates a cross section cut through the center of an ordinary hollow bubble made of alumina, and Fig. 2 illustrates a similar cross section through the center of one of our improved type of pellets made, for example, of 60% MgO and 40% $SiO_2$.

In Fig. 1, I designates the solid finely crystalline alumina wall of the bubble, 2 is the large central cavity characteristic of bubbles of this sort, and 3 is a small wall cavity formed between crystals.

In Fig. 2, which can but inadequately convey the impresison of depth and heterogeneous crystallinity which is characteristic of such pellets, 4 is a characteristic inter-crystalline cavity having a diameter from 10 to 25% of the diameter of the pellet, interconnecting with similar cavities outside the plane of the paper, and 5 is the solid finely crystalline material forming the body of the pellet. It will be noted that the structure of Fig. 2 is far denser than that of Fig. 1. We describe the difference by saying that the product shown in Fig. 2 is multi-cellular, whereas that of Fig. 1 is hollow. In both cases the outer surface is roughly spherical and practically continuous on all sides.

In carrying out our invention, we fuse the material from which it is desired to make pellets, using preferably a furnace of the type well known in the manufacture of fused aluminous abrasives. The material is melted in such a furnace and reduction of oxides of iron, silicon and other undesired metals is also carried out therein as completely as may be desired. The reduced metal is allowed to sink to the bottom of the melt, while any entrapped gas from oxidation of electrode carbons or elsewhere may be allowed to escape, and the remaining molten slag is then caused to flow from the furnace in a thin stream. This effluent stream flows past one or more high pressure air or other gaseous jets directed at approximately right angles to it. The air jet breaks the molten stream into droplets and carries these for several feet before dropping them into a suitable catching device. The droplets solidify before striking and thus have a roughly spherical form. They are not, however, hollow bubbles but multi-cellular pellets.

The size of the pellets produced can be controlled over a considerable range by varying the velocity of the air jet, finer bubbles being produced by the stronger jets. In general, an air pressure of 100 lbs. per square inch with a jet ¼ inch in diameter fitted with a control valve will give a very acceptable product for refractory use.

For the production of multi-cellular pellets, we may use various double oxide combinations, as for example the following:

1. Synthetic forsterite containing about—

| | Percent |
|---|---|
| MgO | 57 |
| $SiO_2$ | 43 |

2. Synthetic magnesia spinel containing about—

| | Percent |
|---|---|
| MgO | 28 |
| $Al_2O_3$ | 72 |

3. "Boro-aluminate" consisting of about—

| | Percent |
|---|---|
| $B_2O_3$ | 20 |
| $Al_2O_3$ | 80 |

4. High alumina mullite composed of about—

| | Percent |
|---|---|
| $Al_2O_3$ | 80 |
| $SiO_2$ | 20 |

While the proportions, which are indicated by weight in each case, may be varied slightly, we find that in general it is desirable to work fairly close to the proportions which yield definite chemical compounds, as the refractoriness of the product is thereby improved and the proportion of multi-cellular pellets kept high. The foregoing examples of compositions are intended to indicate the final product rather than the raw ingredients and any suitable ores may be used.

The double oxide, forsterite, is an end member of an isomorphous series of silicates having the ground molecular formula $2RO.SiO_2$, large quantities of which are found in nature as the mineral olivine $2(MgO.FeO).SiO_2$. Olivine, when high in magnesia, is very refractory and practically identical with forsterite, and we have found that such natural olivine may be used in part or whole as a substitute for synthetic forsterite in making multi-cellular pellets. Magnesia spinel is also a member of an isomorphous series of minerals, the spinel group, but as found in nature in commercial quantities is generally too impure to be used in making cellular pellets. Synthetic solid solutions of magnesia spinel and other spinels may, however, sometimes be used in this process, for example, mixed crystals of magnesia spinel and zinc oxide spinel

$(MgO.ZnO).Al_2O_3$ which form a perfectly homogeneous crystalline compound. In the manufacture of multi-cellular pellets for refractory insulators, compositions approaching the straight two component double oxide compounds, such as forsterite and spinel, are, however, much to be preferred.

We have formulated no explanation of the formation of multi-cellular pellets by the double oxide compounds as distinguished from the formation of hollow spheres by the pure oxides, but regardless of theory we have demonstrated the phenomenon with various compositions and have used the product in the manufacture of insulating bricks and otherwise.

In the production of insulating refractories, we take from 60 to 80% of our pellets, size 14 and finer, mix them with a binder of plastic refractory clay, and temper the mix with enough water to permit molding by any of the well known methods of fabricating refractories. After careful drying, the bricks, etc. are then burned to mature the binder. The materials may also be pulverized and a part of the powdered material used as a binder for the coarser pellets if desired. In general, we prefer to start with material in which the coarsest pellets as stated above are about 14 mesh and the size tapers off to the finer pellets produced by blowing as described. This size distribution is, however, capable of considerable variation, particularly when 25 or 30% of clay is used as a binder.

Another method of manufacturing insulating refractories from cellular pellets is carried out by using no added bonding material. As one example of this method, we screen out part or all of the pellets greater than 20 mesh which we then pulverize to a fine powder by ball milling. From 5 to 20% by weight of this fine powder is added to the residual multi-cellular pellets which make up the bulk of the mix. A small amount of temporary bond such as dextrin is added, the whole is then thoroughly mixed, first, dry, then after adding a small amount of water, and the mix formed into refractory shapes by pressing or molding. After drying, these shapes are fired to high temperatures in a ceramic kiln, the exact firing temperature depending somewhat on the composition of the particular double oxide, but is generally considerably higher than when a clay bond is used.

The refractories so produced by either method have a combination of refractoriness and insulating power which renders them very useful. The following table shows thermal conductivities in calories per centimeter cube per second per degree centigrade for bricks made using our pellets of various compositions and also for the usual variety of alumina bubbles, the bond in each case being the same, i. e., 25% of kaolin. Conductivities for other standard refractories are also shown for comparison.

| Material | Conductivity |
|---|---|
| Common fireclay brick | |
| Alumina bubbles | .004 |
| Bonded solid fused alumina | .005 |
| Our mullite pellets | .008 |
| Our spinel pellets | .004 |
| Our forsterite pellets | .0026 |
| | .0016 |

It is realized that lower conductivities are obtained with diatomaceous earth bricks and the like, but these are not as refractory nor as physically strong as our pellet bricks. Our product is also advantageous from a manufacturing standpoint in that it can be made and burned right along with ordinary clay refractories, or, in the case of self-bonded cellular pellets may be burned in a kiln with super-refractories of silicon carbide or fused alumina.

In both the specification and claims hereof in referring to the pellets of the present invention as being multi-cellular or having multi-cellular interiors the meaning intended is that each pellet has a plurality of cells which are distributed throughout the entire interior of the pellet and furthermore that the pellet does not have any disproportionately large single hollow void or space in its central portion.

Having thus described our invention in terms which will enable anyone skilled in the manufacture of refractories to utilize it, what we claim is:

1. The method of producing globular crystalline pellets having multi-cellular interiors which comprises melting a refractory double oxide and pouring said molten material adjacent a gaseous jet impinging thereupon, thus producing droplets of the material, and keeping the droplets freely suspended until they have solidified.

2. A globular, multi-cellular pellet composed substantially of crystals of forsterite.

3. A globular, multi-cellular pellet composed substantially of crystals of spinel.

4. A globular, multi-cellular pellet composed substantially of crystals of mullite.

5. An insulating refractory article composed principally of globular multi-cellular crystalline refractory pellets and comprising a clay bond therefor.

6. An insulating refractory article comprising globular multi-cellular refractory pellets composed substantially of forsterite.

7. An insulating refractory article comprising globular multi-cellular refractory pellets composed substantially of magnesia spinel.

8. A globular, multi-cellular pellet composed substantially of an ortho-silicate of the olivine group, high in magnesia.

9. A globular crystalline multi-cellular pellet composed of double refractory oxides in substantially molecular proportions.

10. A globular crystalline, multi-cellular pellet composed of silica and another refractory oxide in substantially molecular proportions.

11. The method of producing globular crystalline, multi-cellular pellets which comprises melting a mixture of two refractory oxides in substantially molecular proportions and pouring said molten material adjacent a gaseous jet impinging thereupon, thus producing droplets of the material, and keeping the droplets freely suspended until they have solidified in crystalline form.

12. A globular, refractory pellet composed substantially of a refractory double oxide crystallized from a molten droplet and having a multi-cellular interior.

RAYMOND C. BENNER.
HENRY N. BAUMANN, Jr.